United States Patent [19]

Perhats

[11] 4,308,994
[45] Jan. 5, 1982

[54] ENERGY SAVING CIRCULATING SYSTEM FOR VEHICLE HEATERS

[75] Inventor: Francis J. Perhats, Barrington, Ill.

[73] Assignee: Autotherm, Inc., Barrington, Ill.

[21] Appl. No.: 59,945

[22] Filed: Jul. 23, 1979

Related U.S. Application Data

[63] Continuation-in-part of Ser. No. 911,661, Jun. 1, 1978, abandoned.

[51] Int. Cl.³ .............................................. B60H 1/02
[52] U.S. Cl. .............................. 237/12.3 B; 318/341; 307/315; 417/420; 417/423 R
[58] Field of Search ................. 237/12.3 B, 12.3 R; 417/420, 423; 307/315; 123/142.5 E; 318/341

[56] References Cited

U.S. PATENT DOCUMENTS

| Re. 26,094 | 10/1966 | Zimmermann | 417/420 |
|---|---|---|---|
| 1,931,145 | 10/1933 | Hall | 237/8 R |
| 2,170,032 | 8/1939 | Page | 237/12.3 B |
| 2,230,051 | 1/1941 | Conklin | 237/12.3 B |
| 2,481,172 | 9/1949 | Staggs | 417/420 |
| 2,534,520 | 12/1950 | Katcher | 417/420 |
| 2,612,885 | 10/1952 | Cox | 123/142.5 E |
| 2,654,826 | 10/1953 | Spurlin | 237/12.3 B |
| 2,749,048 | 6/1956 | Edge | 237/12.3 B |
| 2,749,049 | 6/1956 | Smith | 237/12.3 B |
| 2,801,802 | 8/1957 | Jackson | 237/12.3 B |
| 2,941,477 | 6/1960 | Dalton | 417/420 |
| 3,074,349 | 1/1963 | Zimmermann | 417/423 |
| 3,269,653 | 8/1966 | Howard | 237/12.3 B |
| 3,306,221 | 2/1967 | Goodpasture | 417/420 |
| 3,626,148 | 12/1971 | Woytowich | 123/142.5 E |

OTHER PUBLICATIONS

Electronic Design 7, "Switch your High Power Supply Design", Apr. 1, 1975, pp. 116–122.
Solid State Design "of the Darlington Pair", Jun. 1962.

*Primary Examiner*—Henry C. Yuen
*Assistant Examiner*—Henry Bennett
*Attorney, Agent, or Firm*—Alter and Weiss

[57] ABSTRACT

An improved low power drain circulating system for vehicle heaters utilizing a magnetic motor power assembly for selectively circulating hot water from the vehicle's engine to the vehicle's heater, even when the engine is shut off, and having self-contained control circuitry to further the economical power consumption of the system.

2 Claims, 5 Drawing Figures

ENERGY SAVING CIRCULATING SYSTEM FOR VEHICLE HEATERS

This is a continuation-in-part of my previous application Ser. No. 911,611 now abandoned, filed on June 1, 1978, titled ENERGY SAVING CIRCULATING SYSTEM FOR VEHICLE HEATERS.

This invention relates generally to vehicular and automotive heaters; and more particularly, to improved energy saving auxiliary fluid circulating systems which can be selectively used when the vehicle's engine is turned off.

In the area of vehicular heating systems, it is beneficial to selectively circulate the engine's "cooling" fluid, even while the vehicle's engine is not running. For example, the user of the vehicle then utilizes the vehicle's heater, while the vehicle's engine itself is shut off by circulating heated fluid through its heater. Many benefits accrue to the user of such a system who does not have to run the vehicle's engine to obtain heat from the vehicle's heater in cooler weather With conventional automotive heater systems, for example, the user must keep the engine idling to keep the vehicle's heater functional, whether he is driving or not. Thus, vehicles which are parked, for example, must waste precious energy, pollute the atmosphere and actually foul present day sensitively tuned engines simply to obtain heat from the vehicle's heater.

The ability to circulate, independently of the vehicle's engine, the already heated fluid within the vehicle's circulating apparatus or fluids heated by devices, such as immersion heaters, enables extended use of the vehicle's heater to transfer warm air into the vehicle's passenger compartments. The need for vehicular heater systems that can warm the passengers, even when the vehicle engine is turned off, has long been recognized; and accordingly, systems have been designed to fill that need.

Systems utilized to continue the circulation of the vehicle heater system's hot water, even when the engine is shut off, have been disclosed in such patents as those of Page, U.S. Pat. No. 2,170,032, and of Conklin, U.S. Pat. No. 2,230,051.

The system disclosed by the Page patent basically utilizes an independent pump and motor incorporated into the vehicle's hot water circuitry. The Page system, because of its reliance upon additional hot water circuitry, requires the utilization of valve means so as to restrict flow to the original vehicle's hot water circuit, when the engine is temporarily shut off and the battery activated independent motor is used.

The Conklin system discloses a simplified version of the Page apparatus which requires no additional hot water circuitry, but rather uses an electric motor driven pump which fits directly into the already existing automotive hot water circuit. As opposed to the Page system, in which a separate spur circuit has to be used, Conklin's use of a pump with a specific construction allows the passage of the engine generated hot water through the pump itself, when its electric motor is not activated and the engine is still running.

Alternatively, in the Conklin system, when the engine is temporarily shut off and hot water is available in the vehicle's cooling system, the electric motor driven pump can be activated to provide auxiliary pumping means through which the hot water is circulated through the heater's hot water core. In this manner, heated air is supplied to the vehicle, while the engine is shut off. Thus, the already existing automobile's hot water system is utilized directly without provision of an auxiliary valve control circuit system.

Improvements to the systems shown in U.S. Pat. Nos. 2,230,051 and 2,170,032 have been made in such patents as that of Jackson, U.S. Pat. No. 3,801,802, which teaches the use of integrated motor pump assemblies which are directly inserted into a vehicle's hot water circuit. Additionally, automatic on/off switching devices and thermostatic controls have been devised to improve the operation and effectiveness of the type of auxiliary heating system as set forth, for example, in U.S. Pat. No. 2,230,051.

There are basic problems inherent in the presently available auxiliary hot water systems for providing hot water circulation through the automobile heater, even while the engine is not being operated. The hot water system of most present day vehicles is pressurized. The high pressures accentuate the necessity of preventing leakage, especially around the shaft of the auxiliary pump used in the auxiliary circulating systems.

Solving the leakage problems by increasing the packing around the shaft merely accentuates another extremely pertinent problem by increasing the friction; and consequently, increasing the system's power drainage. The system, to be effective, must be miserly in its usage of the limited power available.

This invention relates to the novel combination of parts and controls which minimize power usage; and nonetheless, provide an extremely reliable long lived circulating system for vehicle heaters.

A magnetically coupled "flow through" centrifugal pump assembly is provided in a system capable of circulating hot water through a vehicle's heater, when the engine of the vehicle is shut off. The combination of the heater circuit and a magnetically driven centrifugal pump assembly preferably utilizes the type of pump assembly described in Zimmerman, U.S. Pat. Nos. 3,074,349, 3,117,526 and RE 26,094.

The use of a magnetically driven centrifugal pump assembly in a vehicle's hot water circuit, which enables use of the heater, when the vehicle's motor is off, yields significant advantages to the user. The lack of bearings in the motor pump assembly, as well as seals, improves the longevity of the motor pump device and decreases the power required by the pump assembly, while securing ease in installation and repair of the system. The magnetically driven pump is particularly effective in the auxiliary circulating system, because of the intense heat and corrosiveness of the circulated water. The circulated water contains inherent rust particles and water additive chemicals which have an extremely detrimental effect on conventional motor pump assemblies causing failure in these assemblies. More particularly, the special additives and foreign particles circulating within the hot water system decompose and interfere with bearing assemblies and seals on conventionally driven centrifugal pump assemblies.

A magnetically driven centrifugal pump assembly is relatively impervious to foreign matter and additives, since no motor shaft orifice is needed in such a pump assembly, so that the contaminated water and chemicals flow through a totally enclosed portion of the pump and are precluded from ever entering into or interfering with the mechanical portion of the pump shaft. Thus, leakage problems at the pump shaft are eliminated.

In the magnetically driven pump used, for example, the only parts with which the contaminated water comes into contact are formed of appropriately chosen thermoplastic resins, such as nylon; thus, minimizing the corrosive and interfering aspects of the contaminated water. It has been found that even though the impeller magnets are not in the main flow path, there is no adverse build up of ferrous particles at the impeller magnets.

Should clogging ever occur due to the flotation of larger sized particles and accumulated smaller particles within the heater circuitry, such a magnetically driven centrifugal pump assembly requires only that the magnetically driven impeller blade itself be removed for cleaning. Additionally, less electrical power is expanded, when the magnetically driven centrifugal pump is used, since less usable energy is lost through friction of seals, bearings, and the like. Further, because of the compactness of the magnetically driven pump assembly, the installation is more easily accomplished, less space is required and the system is thus more attractive to the after-market purchaser.

Utilization of a centrifugal pump in such a system enables flow of water to a vehicle's heater, when the engine is running and pumping the water, while the centrifugal pump is de-energized, since the physical characteristics of a centrifugal pump enable the flow of water therethrough in the same direction as originally driven by the main water pump.

Similarly, the use of the present invention with an immersion heater, which can heat the circulated fluids of a vehicle separately and independently of the vehicle's engine enables more effective utilization of the immersion heater for maintaining engines at temperatures that will facilitate starting the engine, even at extremely low temperatures.

A problem common to all auxiliary vehicular heating systems used primarily while the engine is not running is that of power drainage. The battery life is limited. Therefore, to provide a workable and practical commercial system, it is necessary to minimize power loss. The power loss occurs in running the motor driven pump and in the auxiliary vehicular heating system control circuitry. Thus, both have to be power efficient.

Another problem faced by auxiliary vehicular heating systems is that as the original equipment automatic temperature control systems become more complicated, it becomes more difficult to incorporate auxiliary vehicular heating systems without adversely affecting the operation of the original equipment.

Accordingly, it is an object of the present invention to provide new and unique auxiliary vehicular heating systems which are readily installed without upsetting preexisting systems, use a minimum amount of power, and nonetheless are long lived and reliable.

It is a related object of the present invention to provide an integrated motor pump assembly for installation into a vehicle's original hot water circulating system to enable utilization of the vehicle's heater, when the vehicle's engine is turned off. Even more prolonged and continuous usage of the heater can be made possible through utilization of the invention with a remotely operable immersion heater which serves to heat a vehicle's circulated fluids apart from the fluid heating characteristics of an operating engine.

It is a further object of the present invention to reduce the dependence on bearings and seals within such a motor pump assembly, so as to prevent decomposition and interference to the motor pump assembly from hot and corrosive water and additives circulating through the vehicle's hot water system, as well as to minimize friction and to eliminate the possibilities of water leakage through a motor shaft pump blade connective orifice.

Additionally, it is an object of the present invention to: (1) eliminate the need for entrance of the motor shaft into the actual housing of the pump through which the hot water of the vehicle passes; (2) keep the impeller magnets out of the main flow path of the pumped fluid; and (3) utilize non-metallic parts within that portion of the pump through which the pressurized hot water and corrosive additives pass.

It is a further object of the present invention to provide a compact, easy-to-install motor pump assembly in the vehicle's existing hot water circulating system which is easy to unclog and repair, is not subject to corrosion, rusting or leaking and one which requires significantly less electrical power drain through a more efficient power transmission device.

Yet another object of the present invention is to provide auxiliary vehicular heating systems which have controls that are virtually independent of the originally supplied control circuitry and further reduce the power drain of the original circuitry.

The novel combination of a heater circulating system usable when the engine of a vehicle is off, together with a magnetically driven centrifugal pump assembly and unique pump and fan control circuitry enables these advantages and extend use of the auxiliary heating system; in contrast to prior art systems that are prone to leakage and excessively drain the batteries.

The present invention is a vehicular hot water circulating system for circulating the hot water in a water cooled vehicle so as to enable use of the vehicle's heater, when the vehicle's engine is temporarily shut off. An independently driven circulating pump is positioned in the vehicle's engine block to and through said vehicle's hot water heater, returning back to the vehicle's engine block. The system comprises a magnetically coupled centrifugal pump assembly integrated with an electric motor, such that the circulating pump passively allows passage of hot water to the vehicle's heater, when the hot water is driven through the hot water heating circuit by the vehicle's engine. It is additionally capable, through activation of its electric motor, of continuing the circulation of the vehicle's still hot water, when the vehicle's engine is shut off; thus, enabling effective use of the vehicle's heater.

The magnetically coupled motor pump assembly is installed into the vehicle's existing hot water heater circuitry most easily by simply severing the present circulating conduit, attaching one end of the severed conduit into the input line of the circulating pump and similarly placing the other line of the severed conduit into the output line of the circulating pump. A control box comprising solid state circuitry is used for controlling the operation of the auxiliary pump for the hot water circulating system and vehicle heater fan. The controls of the control box enhance the auxiliary pump system and electrically isolate the auxiliary system. Electrically, the control box is attached to the ignition coil primary, for example, and also to the heater fan, and to the prior power connection of the fan.

When the vehicle's engine is shut off, the motor pump device which has been placed into the hot water circuitry of the vehicle can be activated through the control box manually or by thermostatic controls. The activation of the motor pump unit continues circulation of the still hot water through the vehicle's heater so as to allow the user of such a vehicle a functioning heater, which otherwise would normally be ineffective shortly after the vehicle's engine is shut off.

Additional coupling of the invention with an immersion heater device in one embodiment can prolong the heater's usage even more, so as to avoid premature cooling of the radiator fluids, after the engine is shut off and to aid in starting the engine under extremely cold conditions.

The use of a magnetically coupled centrifugal pump eliminates friction and leakage problems encountered by conventional motor pump assemblies in which the shaft from the motor is coupled directly to the pump impeller blade. Such a conventional motor pump assembly requires the use of seals and bearings and necessary washers to insulate the motor shaft, motor housing the motor circuitry from the fluids circulating through the pump housing, because of their obvious destructive characteristics. In the present invention, however, no shaft is needed to connect the motor to the pump blade within the pump housing; thus, no bearings, seals, washers, etc. are necessary, thereby prolonging the life of the motor pump unit.

Additionally, the motor pump specifications of the present invention is of such a compactness to take up a minimum of space in the vehicle, when installed, so as to facilitate installation, and is of such a fabrication to enable facilitated repair if clogging were to occur from rust particles, and the like in the pump portion of the hot water circulating device. The control incorporated into the auxiliary vehicular heating has no adverse effect on manufacturer installed temperature control systems and aids in reducing power consumption. These qualities further establish the present system as a desirable product for addition to a vehicle in the automotive "after market".

The above mentioned and other objects and features of the present invention together with the manner of obtaining them will be best understood by making reference to the accompanying drawings, wherein.

Figure 1:
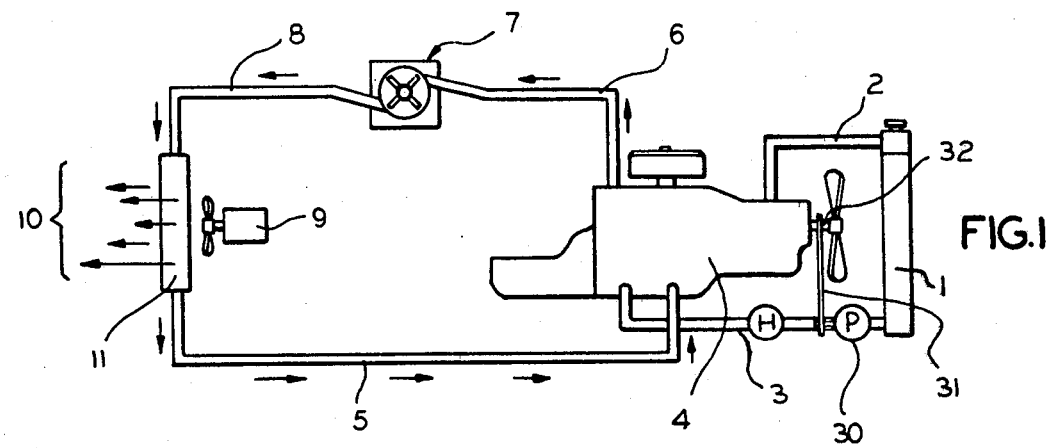
FIG. 1 is a schematic diagram of the auxiliary hot water circulating system circuitry of the present invention as used in a water cooled vehicle.

While this invention is susceptible of embodiment in many different forms, there is shown in the drawings and will herein be described in detail, one specific embodiment, with the understanding that the present disclosure of the invention is to be considered as an exemplification of the principles of the invention and is not intended to limit the invention to the embodiment illustrated.

A schematic drawing of a vehicular cooling system is shown in FIG. 1, in which water cooled engine 4 utilizes radiator 1, hot water circuit 2 and cool water return circuit 3. On most vehicles having a water cooled engine, an additional circuit, such as that represented by conduits 6-8-5 is provided with the vehicle so as to enable use of the vehicle's heater 11.

As can be seen, hot water transmitting conduit 6, in the absence of the present invention, connects directly to the hot water transmitting conduit 8 so as to enable transmission of the hot water from the engine through heater core 11, at which time fan 9, pushing air through core 11, transfers the heat 10 from heater core 11 into the vehicle itself. Vehicle water pump 30, operated by fan belt 31 connected to engine shaft 32, pumps the vehicle's water, when the engine is on.

Circulation device 7 has been interposed between hot water transmitting conduit 6 and hot water transmitting conduit 8 so as to enable flow from conduit 6 to conduit 8; and subsequently, through the heater in either one of two water circulation situations.

When engine 4 is running, and thus pumping water through conduits 6-8-11-5, electrically operated circulation device 7 is not activated, but merely passively enables the natural flow of the engine pumped water from conduit 6 to conduit 8 towards the heater with subsequent return of the water to engine 4. However, when engine 4 is shut off, hot water circulation device 7 is electrically activated by manual switch or automatic thermostat control and changes from its passive role of enabling pumped water to pass through it to that of an active pump, which will continue the transmission and circulation of hot water still present in engine 4 through hot water conduits 6-8-11-5. This provides circulation of hot water already in the engine through the heater 11 to enable the use of the heater, even when the engine is shut off.

At the same time the water that is used in the heater is pumped back to the still warm engine for reheating and recirculation through the heater. Through utilization of immersion heater H in circuit 3, prolonged indefinite use of heater 11 can be accomplished, even though engine 4 is shut off. In this situation, the coolant can be maintained substantially hot for use by heater 11 and circulated continuously to it by circulation device 7.

Figure 2:
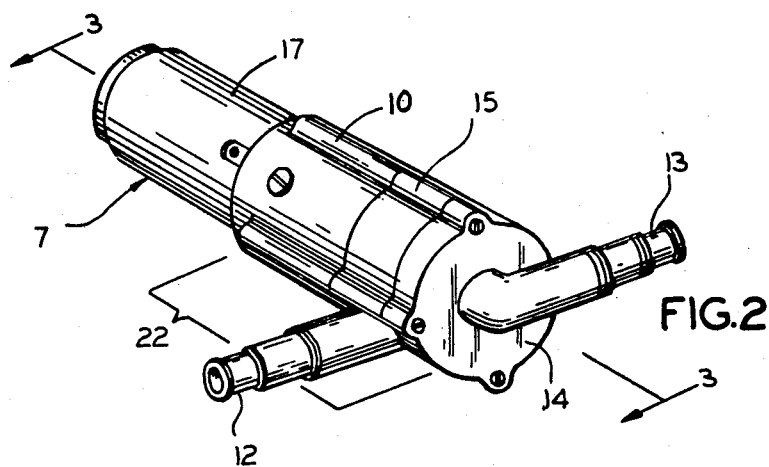
FIG. 2 is a side perspective view of the electric motor pump assembly having a magnetically driven centrifugal pump portion.

The circulation device 7 is an integrated pump motor device, such as shown in FIG. 2. Device 7 is comprised of motor housing 17, motor extension collar 10, pump chamber housing 15 and pump inlet cover 14. The preferred embodiment of the motor pump assembly 7 is a magnetically coupled centrifugal pump assembly 22, shown with input orifice sleeve 13 and output orifice sleeve 12.

Figure 3:
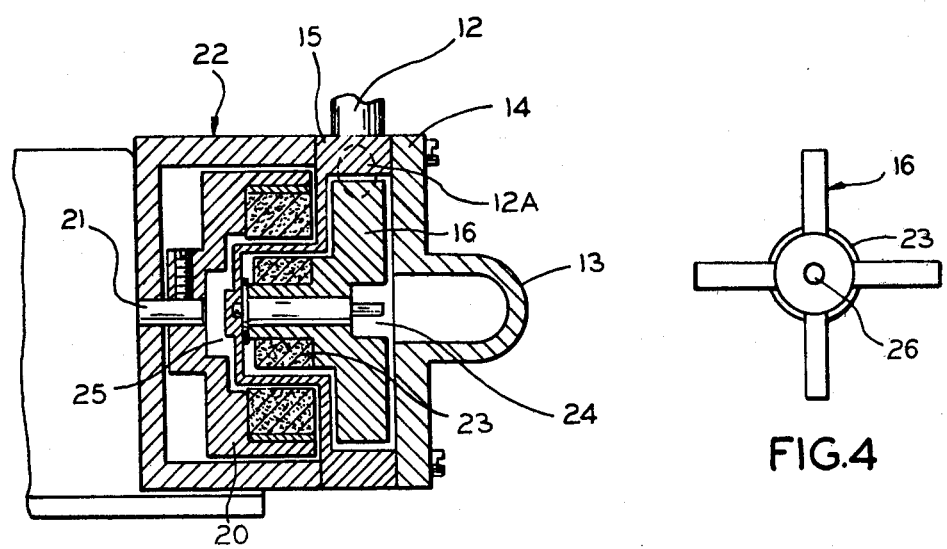
FIG. 3 is an elevational, cross-sectional view of the magnetically driven centrifugal pump portion of the motor pump assembly taken along lines 3—3 of FIG. 2 and looking in the direction of the arrows.

A cross sectional view of magnetically coupled centrifugal pump assembly 22 is shown in FIG. 3, which in turn displays pump inlet cover 14, pump chamber housing 15 and input and output orifice sleeves 13 and 12, respectively. Motor shaft 21 extends into motor extension collar 10 towards the magnetically coupled centrifugal pump assembly 22 and has attached at its end cylindrical magnetic yoke 20.

Pump impeller blade 16 revolves in alignment with the revolutions of cylindrical yoke 20 attached to the electric motor, not through actual attachment of a continuous shaft from the motor, but rather through the magnetic force of yoke 20 being followed by magnetic base 23 of blade 16. Thus, pump chamber 24 is totally segregated and sealed from contact with any portion of the motor, the motor shaft 21 or magnetic yoke 20.

Upon entry of caustic, hot radiator water through input orifice 13, this liquid is segregated within pump chamber 24 and cannot drip down into vacant space 25. Thus, no seals, bearings, or the like, have been utilized or are needed to connect motor shaft 21 to rotating pump impeller blade 16. The lack of shaft packing lenghthens the life of the pump and reduces the power drain.

In one preferred embodiment of the invention the impeller magnet base 23 is removed from the main flow circuit that extends from input orifice 16, chamber 24, around blades 16 and out orifice 12a. The metallic particles normally found in the coolant of the cast iron engine, however, do not build up on the magnet 23.

Figure 4:
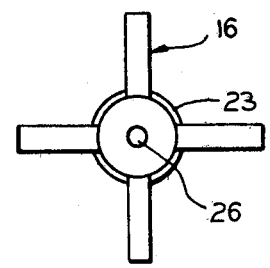
FIG. 4 is a top view of the pump blade used within the magnetically driven centrifugal pump portion of the present invention.

A top elevational view of pump impeller blade 16 and impeller blade base 23 is shown in FIG. 4. Blade orifice 26 in the center of blade 16 enables the insertion of blade 16 over a spindle emanating from the bottom portion of the pump chamber itself, around which blade 16 revolves.

Figure 5:
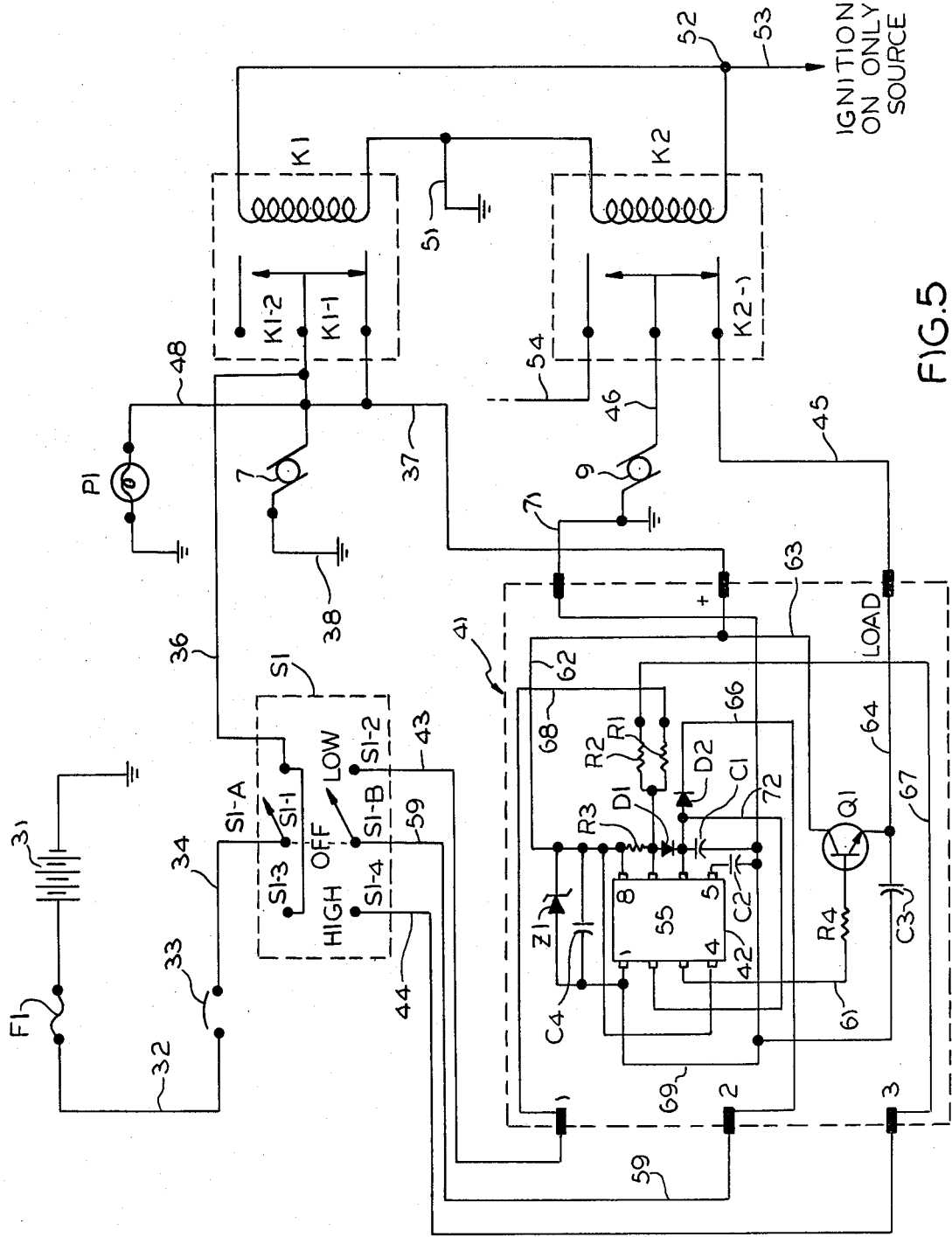
FIG. 5 is a schematic showing of the controls for the auxiliary hot water circulating system of the present invention.

Means are provided for automatically operating both the circulation device 7 and the fan of the vehicle heater and for isolating the circulating system controls from the original temperature control circuits of the vehicle. More particularly, as shown in FIG. 5, a pair of relays K1 and K2 are provided. Relay K1 acts to control the power to circulating device 7, while relay K2 controls the power to fan motor 9.

Circulating device 7 is connected to the battery over a circuit that extends from the positive pole of battery 31 through fuse F1, conductor 32, thermostat 33, conductor 34, double-pole, double-throw center off switch S1, conductor 36, normally closed relay contact K1-1, conductor 37 through the motor of circulating device 7 to ground at 38. The energization circuit for the fan motor 9 extends from the negative pole of battery 31 through fuse F1, conductor 32, thermostat 33, conductor 34, switch S1 to current control circuit 41.

Means are provided for limiting the current through the fan. More particularly, current control circuit 41 is shown in this preferred embodiment as including an astable oscillator 42, such as provided by National Semi-Conductor Co. in their package LM555CN. The control circuitry 41 is connected through the low fan position or the high fan position of the switch S1. It should be recognized that other circuits could be used in place of the astable oscillator.

The low fan position of the switch is when the double-pole, double-throw armature contacts S1A, S1B connect to contacts S1-1 and S1-2, respectively. The high fan position includes contacts S1-1 and S1-2 connected to armature contacts S1A and S1B, respectively.

The astable circuit 42 provides an output pulse that effectively operates the fan motor. More particularly, the output pulse causes the emitter of transistor Q1 to also pulse. When the output of 42 goes low, the low is transmitted to the base of transistor Q1 over conductor 61 and biasing resistor R4. Responsive to the lows on the base of transistor Q1, operating current flows through the resistor to the fan motor 7 over a circuit that includes positive battery (coupled through conductor 37), conductor 62, conductor 63, transistor Q1, conductor 64, the load terminal of circuit 41, conductor 45, normally closed contacts K2-1, conductor 46 and fan motor 9 to ground.

The speed of the motor is controlled by varying the off time of the transistor Q1; i.e. the low output of the astable circuit 42. This is accomplished by varying the discharge time of capacitor C1 rather than by the energy consumptive use of resistors to vary the current flow. Capacitor C1 is coupled between the threshold input 6 of circuit 42 and ground. It is normally charged over a circuit that includes positive battery at the input of circuit 41, conductor 62, resistor R3 and diode D1.

When transistor Q1 conducts responsive to the oscillator output, then capacitor C1 discharges over a circuit that includes diode D2, conductor 66, terminal 2 of circuit 41, conductor 52, armature S1B to either the high or the low speed connections of switch S1. For the high speed connection, the circuit continues through contact S1-4, conductor 44, terminal 3 of circuit 41, conductor 67, and through resistor R2 to the discharge terminal 7 of circuit 41 which is low at this time.

When switch S1 is in the low speed position, then armature S1-B is coupled to contact S1-2, conductor 43, terminal 1 of control circuit 41, conductor 68 and through resistor R2 to the discharge terminal 7 of circuit 41. Resistor R2 is approximately twice as large as resistor R1; and therefore, the discharge time is longer by a factor of approximately two. The output of the astable oscillator at terminal 3 is positive during the discharge time of capacitor C1; and thus, the longer the discharge time the longer transistor Q1 is not conducting and the slower the fan motor.

The astable oscillator circuit has the following inputs: Terminal 1 is tied to ground over a circuit that includes conductor 69, the negative terminal of control circuit 41 and conductor 71 to ground; Terminal 2 is the trigger terminal and it is tied to threshold terminal 6 over conductor 72; The connection to the output terminal 3 has previously been discussed; The reset terminal 4 is coupled to positive battery through conductors 73 and 62; The control voltage terminal 5 is coupled to ground through timing capacitor C2; The connections to terminals 6 and 7 were previously discussed; The positive battery terminal is tied to positive battery over conductor 62; A regulating zener diode Z1 is attached between terminals 1 and 8. A filter capacitor C4 bridges the zener diode. Another filter capacitor C3 is attached between the emitter of transistor Q1 and ground.

The control circuit thus varies the fan speed in an energy efficient manner. The pump is also controlled by switch S1. When the switch is at either the high or the low setting, the pump operates as does pilot light P1. However, if the ignition switch is on, relays K1 and K2 operate and the pump and pilot light are disconnected from power, while the fan obtains its power over the regular circuitry.

In a preferred embodiment, the components have the following values:

| R1 = 360K Ohms | C1 = 0.1 μfd. |
|---|---|
| R2 = 620K Ohms | C2 = .01 μfd. |
| R3 = 91K Ohms | C3 = 22 μfd. |
| R4 = 40 Ohms | C4 = 470 μfd. |

The coils of relays K1 and K2 are joined together through conductor 49, which is tied to ground at 51. The other end of coils of relays K1 and K2 are joined together at 52 and from there to either the primary of the ignition coil or any other ignition on only power source through conductor 53. Thus, when the ignition is on, both relays K1 and K2 are operated, closing contacts K1-2, K2-2 and opening contacts K1-1 and K2-1. When contacts K1-1 is open, then circulating device 7 is de-energized. At that time, the vehicle pump is normally pumping the heat carrying fluid of the system through the heater.

At that time, with the ignition on, K2-2 contacts close, K2-1 contacts open so that the fan motor 9 is operated through conductor 54 connected to its normal control circuitry. When the ignition switch is off, then contacts K1-1 close to energize circulator device 7 and contacts K2-1 close to energize the fan motor through the current control circuitry 41.

Thus, to connect the improved circulating system for vehicle heaters, the lead to the fan motor 9 is removed from the fan motor connection and attached instead to the terminal connected to the movable contact of contacts K2-2. A lead 56 is connected to the negative voltage. A lead 53 is connected to the ignition coil primary or any other ignition on only source.

With the control circuit in place then circulator device 7 is operated any time the ignition is off until the coolant cools sufficiently to open thermostat 33. A switch may be used in series with thermostat and conductor 34 to enable an operator to manually disconnect the circulator device 7. Thus, the system with its control circuitry is isolated from the original temperature controls in the vehicle and further reduces the current drain caused by the operation of fan motor 9.

The foregoing description and drawings merely explain and illustrate the invention, and the invention is not limited thereto, except insofar as the appended claims are so limited, as those skilled in the art who have the disclosure before them will be able to make modifications and variations therein without departing from the scope of the invention. The utilization of a centrifugal type pump assembly, for example, describes only one pump embodiment usable in the present invention, and the circulating system is not limited as to such.

I claim:

1. An energy-saving, pressurized hot liquid circulating system to circulate hot liquid from a liquid-cooled vehicle engine through the vehicle's heater, said vehicle of the type having an electric storage battery to energize certain of the vehicle's accessories, and having a hot liquid circulating system of the type including a radiator, engine liquid jacket, and said heater, said system comprising:
means to pump said hot liquid through said vehicle heater when said engine is turned off,
said pump means receiving its driving power solely from said vehicle battery;
conduit means coupling said vehicle heater to said liquid jacket,
said pump means positioned in series with said conduit means intermediate said vehicle heater and said liquid jacket,
said pump means being of the centrifugal type having a motivating impeller driven responsive to the rotation of a drive shaft of an electrical motor,
means for magnetically coupling said motor shaft to drive said impeller,
said magnetic coupling means adapted to drive said impeller without requiring said motor shaft to pass through said conduit,
said impeller being mounted on an impeller shaft,
said impeller having a base magnet attached thereto,
said impeller being enclosed in a non-metallic casing,
said casing having a protruding portion for receiving said base magnet of said impeller,
said impeller shaft extending through said cylindrical magnet and said impeller; and
means for mounting said impeller shaft entirely within said casing to enable rotation of said magnetic coupling means about the outer periphery of said protrusion to thereby shorten the lines of flux between said base magnet and said magnetic coupling means whereby, when said motor shaft rotates, it more effectively causes said base magnet to rotate; and
means to control the operation of said vehicle fan and said pump means,
said control means including an electrical relay,
said relay operated responsive to the operating or non-operating of said engine,
first and second normally closed contacts on said relay,
said first contacts connected in series between said battery and said pump means, and
said second contacts connected in series between said battery and said vehicle fan,
said relay directing electrical current to said fan when said engine is non-operating,
said control means further including relatively, non-resistive intermittenly operating switching means to control the speed of said vehicle fan when said second contacts are closed, in order to minimize power drain of said battery,
said first contacts directing electrical current to said pump means to operate said pump means when said engine is non-operating.

2. The apparatus as recited in claim 1 including manual switch means to selectively complete a circuit between said fan means and said pump means to said battery,
said fan speed control means includes means to control the current to said fan,
said fan spaced control means positioned intermediate said relay and said switch means.

* * * * *

UNITED STATES PATENT AND TRADEMARK OFFICE
CERTIFICATE OF CORRECTION

PATENT NO. : 4308994
DATED : January 5, 1982
INVENTOR(S) : Francis J. Perhats

It is certified that error appears in the above-identified patent and that said Letters Patent are hereby corrected as shown below:

Column 1, line 6        "Ser. No. 911,611" should be instead --Ser. No. 911,661--

Column 4, line 66       "When the" should be instead --When a--

Column 10, line 41      "intermittenly" should be instead --intermittently--

Column 10, line 54      "spaced" should be instead --speed--

Signed and Sealed this

Twentieth Day of July 1982

[SEAL]

Attest:

GERALD J. MOSSINGHOFF

Attesting Officer    Commissioner of Patents and Trademarks